US012587406B2

(12) United States Patent
Huang et al.

(10) Patent No.: US 12,587,406 B2
(45) Date of Patent: Mar. 24, 2026

(54) METHOD FOR CONTROLLING THE APPOINTMENT OF FUNCTIONS OF SMART HOME APPLIANCES

(71) Applicant: Intex Marketing Ltd., Tortola (VG)

(72) Inventors: Zhi Xiong Huang, Fujian (CN); Ying Biao Zhang, Fujian (CN)

(73) Assignee: Intex Marketing Ltd., Tortola (VG)

( * ) Notice: Subject to any disclaimer, the term of this patent is extended or adjusted under 35 U.S.C. 154(b) by 314 days.

(21) Appl. No.: 18/265,596

(22) PCT Filed: Dec. 10, 2021

(86) PCT No.: PCT/IB2021/061584
§ 371 (c)(1),
(2) Date: Jun. 6, 2023

(87) PCT Pub. No.: WO2022/123529
PCT Pub. Date: Jun. 16, 2022

(65) Prior Publication Data
US 2024/0031190 A1     Jan. 25, 2024

(30) Foreign Application Priority Data

Dec. 10, 2020     (CN) ......................... 202011433856.X

(51) Int. Cl.
*H04L 12/28* (2006.01)
*H04M 1/72415* (2021.01)

(52) U.S. Cl.
CPC ...... *H04L 12/281* (2013.01); *H04M 1/72415* (2021.01); *H04L 2012/2841* (2013.01)

(58) Field of Classification Search
CPC .......... H04L 12/281; H04L 2012/2841; H04M 1/72415; H04W 4/80; H04W 76/10; H04W 84/12
See application file for complete search history.

(56) References Cited

U.S. PATENT DOCUMENTS 11,171,803 B2 * 11/2021 Finnegan ............ H04L 12/2814
2014/0163751 A1 * 6/2014 Davis ..................... G08C 17/02
700/286

(Continued)

FOREIGN PATENT DOCUMENTS

CN        107643907        1/2018
CN        110837228        2/2020

OTHER PUBLICATIONS

International Search Report and Written Opinion as issued by the International Searching Authority, dated Feb. 22, 2022, for International Patent Application No. PCT/IB2021/061584; 10 pages.

(Continued)

*Primary Examiner* — Abdullahi E Salad
(74) *Attorney, Agent, or Firm* — Faegre Drinker Biddle & Reath LLP

(57) ABSTRACT

A method for controlling the appointment of functions of smart home appliances that only when the user control interface completes the appointment setting, the mobile terminal sends the appointment control instruction to the controlled smart home appliance is provided. The mobile terminal does not send the appointment control instruction to the controlled smart home appliance until the next time the user updates the appointment setting, the mobile terminal sends the appointment control instruction to the controlled smart home appliance again to update the appointment control of controlled smart home appliances, the controlled smart home appliance receives the appointment control instruction sent by the mobile terminal, uses the function activation counter and the function duration counter of the microcontroller to count down respectively, and cooperates with the cyclic shift of the N work flag bits used to indicate whether the function is activated or not to realize the cycle control of the function, the microcontroller does not need to be configured with a clock module, which not only reduces (Continued)

10 —

Setting the mobile terminal and the controlled smart home appliance in the same wireless communication network, or via a common remote server, so that the mobile terminal and the controlled smart home appliance can realize communication interaction

20 —

Defining the communication protocol between the mobile terminal and the controlled smart home appliance, a data structure of a single function appointment sent by the mobile terminal is a controlled smart home appliance ID+a countdown value of the function activation counter+a countdown value of the function duration counter+a corresponding function ID+a function control parameter+a flag bit for cyclic control+a N work flag bits used to indicate whether the function is activated or not+a shift control bit

30 —

The shift control bit controls the value of the first bit of the N work flag bits used to indicate whether the function is activated or not to move to the last bit, and the values of other bits are all shifted to the left by one To FIG. 1B the cost, but also does not need to calibrate the clock regularly, which improves the accuracy of the appointment control.

3 Claims, 3 Drawing Sheets

(56)                    References Cited

U.S. PATENT DOCUMENTS

| | | | |
|---|---|---|---|
| 2014/0207707 A1* | 7/2014 | Na | G08C 17/02 |
| | | | 709/208 |
| 2016/0286607 A1* | 9/2016 | Mishra | G08B 25/009 |
| 2017/0244574 A1* | 8/2017 | Moon | H04L 41/22 |
| 2018/0124722 A1* | 5/2018 | Zheng | H04W 56/001 |
| 2018/0205788 A1* | 7/2018 | Kim | H04L 67/1068 |
| 2019/0109724 A1* | 4/2019 | Hall | H04L 12/2807 |
| 2019/0132396 A1* | 5/2019 | Finnegan | H04L 12/2818 |
| 2019/0327106 A1* | 10/2019 | Zhu | G06F 3/167 |
| 2020/0106832 A1* | 4/2020 | Kim | H04L 12/281 |
| 2022/0078232 A1* | 3/2022 | Kim | H04L 12/2816 |
| 2023/0121623 A1* | 4/2023 | Wu | H04W 4/021 |
| | | | 709/238 |

OTHER PUBLICATIONS

International Preliminary Report on Patentability issued by The International Bureau of WIPO, dated Jun. 13, 2023, for International Patent Application No. PCT/IB2021/061584; 9 pages.

* cited by examiner

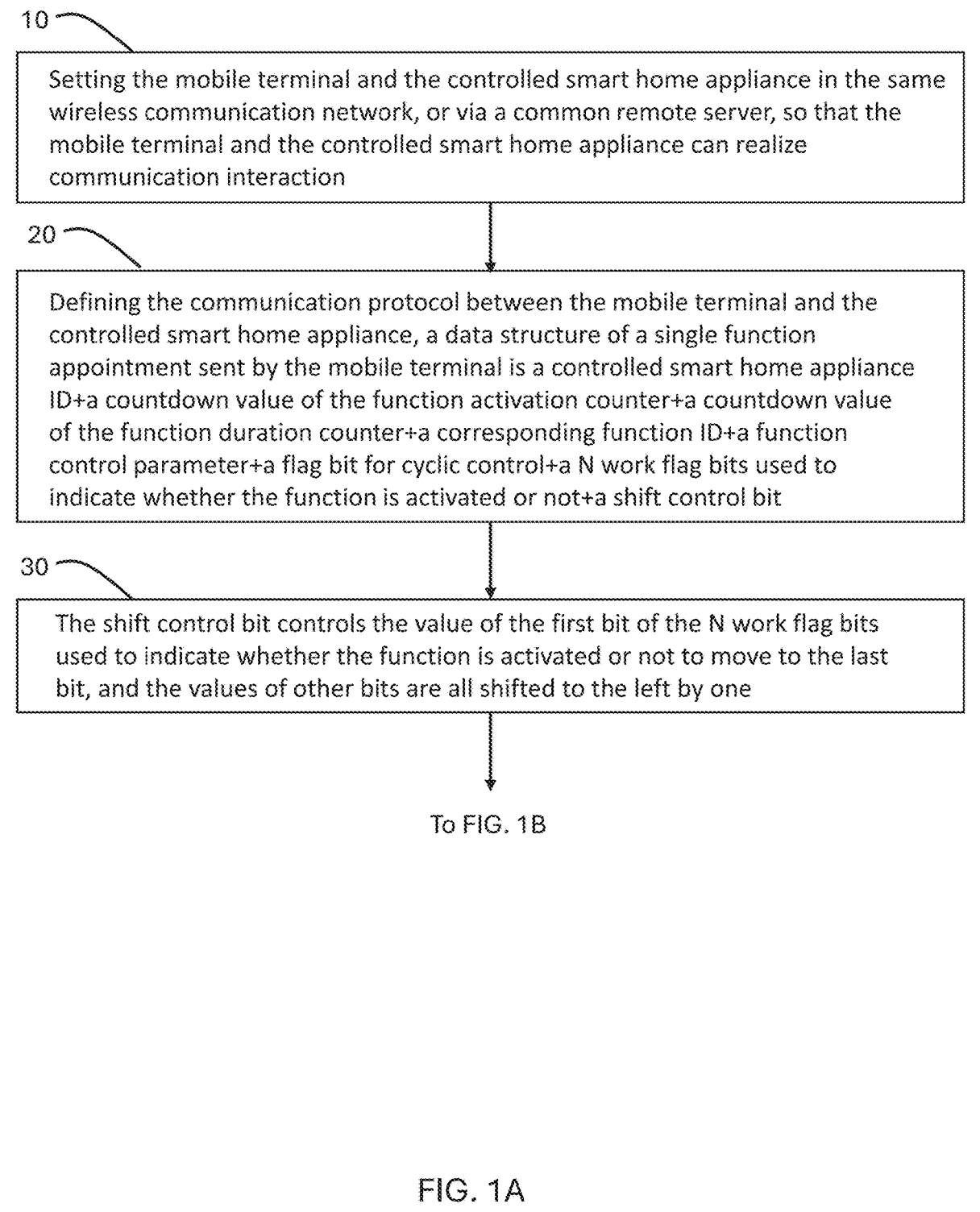

10

Setting the mobile terminal and the controlled smart home appliance in the same wireless communication network, or via a common remote server, so that the mobile terminal and the controlled smart home appliance can realize communication interaction

20

Defining the communication protocol between the mobile terminal and the controlled smart home appliance, a data structure of a single function appointment sent by the mobile terminal is a controlled smart home appliance ID+a countdown value of the function activation counter+a countdown value of the function duration counter+a corresponding function ID+a function control parameter+a flag bit for cyclic control+a N work flag bits used to indicate whether the function is activated or not+a shift control bit

30

The shift control bit controls the value of the first bit of the N work flag bits used to indicate whether the function is activated or not to move to the last bit, and the values of other bits are all shifted to the left by one To FIG. 1B

FIG. 1A

From FIG. 1A

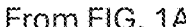

40

Completing an appointment setting on the user control interface provided by the mobile terminal, the user control interface comprising the following input items and/or options: a list of certified controlled smart home appliances, a list of functions corresponding to the controlled smart home appliances, a parameter input and/or selection list corresponding to each function, a time point of the activation of the function, a duration of the function, a periodic list of optional function, a periodic list provides N options of appointment, an interval between the two options is T1; only when the appointment setting is completed on the user control interface, the mobile terminal sending an appointment control instruction to the controlled smart home appliance, the mobile terminal does not send the appointment control instruction until the next time the appointment setting is updated

50

After the user completes the appointment setting, calculating with the mobile terminal the countdown value of the function activation counter according to the interval from the current time at the time of setting to the time point of the activation of the function, and calculates the countdown value of the function duration counter according to the duration of the function, and at the same time, according to the current time, the time point of the activation of the function, the duration of the function, and the options of appointment in the periodic list, N work flags are formed to indicate whether the function is activated or not, the flag bit is 0 for not working, 1 for working, and sending a control command comprising at least one function appointment to the controlled smart home appliance To FIG. 1C

FIG. 1B

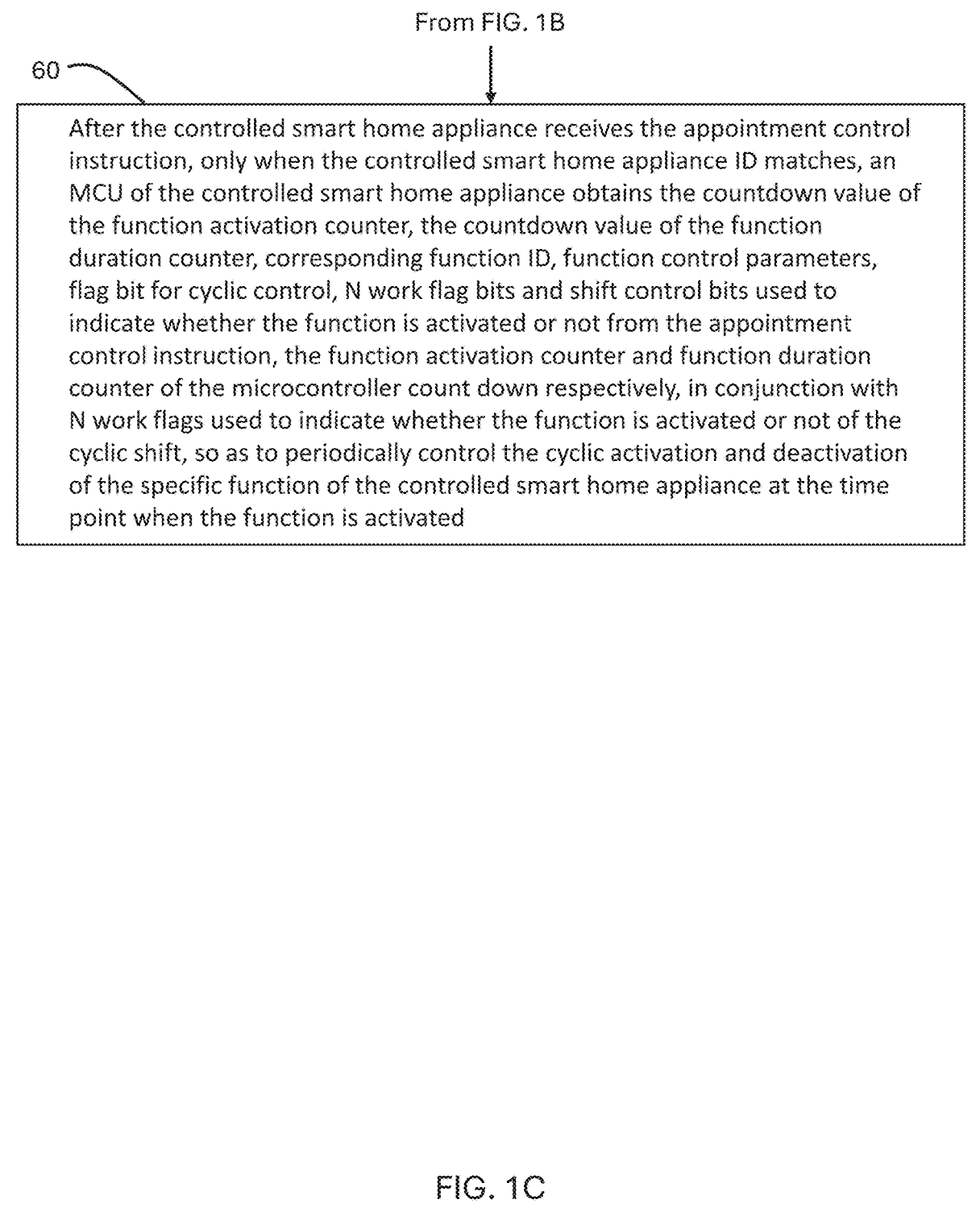

From FIG. 1B

60

After the controlled smart home appliance receives the appointment control instruction, only when the controlled smart home appliance ID matches, an MCU of the controlled smart home appliance obtains the countdown value of the function activation counter, the countdown value of the function duration counter, corresponding function ID, function control parameters, flag bit for cyclic control, N work flag bits and shift control bits used to indicate whether the function is activated or not from the appointment control instruction, the function activation counter and function duration counter of the microcontroller count down respectively, in conjunction with N work flags used to indicate whether the function is activated or not of the cyclic shift, so as to periodically control the cyclic activation and deactivation of the specific function of the controlled smart home appliance at the time point when the function is activated

FIG. 1C

METHOD FOR CONTROLLING THE APPOINTMENT OF FUNCTIONS OF SMART HOME APPLIANCES

RELATED APPLICATION

This application is related to Chinese Application No.: CN202011433856.X, filed Dec. 10, 2020, the entire disclosure of which is expressly incorporated by reference herein.

TECHNICAL FIELD

The present invention relates to the field of intelligent control, and particularly relates to a method for controlling the appointment of functions of smart home appliances.

BACKGROUND

Smart home appliances mainly have wired, wireless and a combination of wired and wireless control methods. With the development of wireless technologies such as WLAN, IrDA, Bluetooth, ZigBee, and HomeRF, wireless technology is gradually applied to smart home appliances. Compared with wired methods, wireless wiring costs low, and it has great advantages in stability, energy saving and subsequent expansion, smart home appliances using wireless sensor networks and wireless controllers have become a focus of attention. With the widespread use of smart phones, smart tablets and other mobile terminals, the control of smart home appliances based on wireless networks such as Wi-Fi, Bluetooth, etc. through mobile terminals is widely welcomed by manufacturers and users due to its convenience, speed, and flexibility.

Existing smart home appliances are controlled through mobile terminals. Most of the mobile terminals are loaded with user-friendly APP. Users input control parameters through the control interface of the APP, and send control commands to the smart home appliances via wireless networks such as Wi-Fi, Bluetooth, etc. If you need to send an appointment instruction to smart home appliances, for example, set the heating function of the massage bathtub at 5 pm every other day of the week, and the filter and disinfection function of the swimming pool at 10 am every Saturday. Such periodic appointment instructions require timing control. The timing control work is either completed in the APP of the mobile terminal or sent to the smart home appliance. The control terminal of the smart home appliance sets one or more timed control commands according to the appointment commands, and implements single or cyclic functional control of the smart home appliances. In the first method, mobile terminal APP and smart home appliances need to interact regularly. Not only smart home appliances rely too much on mobile terminal APP, the user experience is not good, but the mobile terminal APP is often activated to keep running in the background, which increases the burden on the mobile terminal. The second method is that the control end of smart home appliances needs a timing module with a clock, and for precise control, the clock needs to be calibrated regularly. For smart home appliances, it increases the configuration requirements for the control terminal, thereby increasing the cost of the product.

SUMMARY

The present application provides a method for controlling the appointment of functions of smart home appliances which may solve the above technical problems. After receiving the appointment instruction of the mobile terminal, there is no need for regular interaction, no need to calibrate the clock of the smart home appliances regularly, and the functions of the smart home appliances can be realized.

The method for controlling the appointment of functions of smart home appliances of the present application comprises at least one mobile terminal providing a user control interface, and at least one smart home appliance capable of communicating with the mobile terminal, the control module of the smart home appliance is a microcontroller with a function activation counter and a function duration counter, the method comprises the following steps:

Step 1. Set the mobile terminal and the controlled smart home appliance in the same wireless communication network, or via a common remote server, so that the mobile terminal and the controlled smart home appliance can realize communication interaction;

Step 2. Define the communication protocol between the mobile terminal and the controlled smart home appliance, the data structure of a single function appointment sent by the mobile terminal is: the controlled smart home appliance ID+the countdown value of the function activation counter+the countdown value of the function duration counter+corresponding function ID+function control parameter+flag bit for cyclic control+N work flag bits used to indicate whether the function is activated or not+shift control bit;

The shift control bit is used to control the value of the first bit of N work flag bits used to indicate whether the function is activated or not to move to the last bit, and the values of other bits are all shifted to the left by one;

Step 3. The user control interface provided by the mobile terminal comprises the following input items and/or options: a list of certified controlled smart home appliances, a list of functions corresponding to the controlled smart home appliances, a parameter input and/or selection list corresponding to each function, the time point of the activation of the function, the duration of the function, the periodic list of optional function, the periodic list provides N options of appointment, the interval between the two options is T1; only when the appointment setting is completed on the user control interface, the mobile terminal sends the appointment control instruction to the controlled smart home appliance, the mobile terminal does not send the appointment control instruction until the next time the appointment setting is updated;

Step 4. After the user completes the appointment setting, the mobile terminal calculates the countdown value of the function activation counter according to the interval from the current time at the time of setting to the time point of the activation of the function, and calculates the countdown value of the function duration counter according to the duration of the function, and at the same time, according to the current time, the time point of the activation of the function, the duration of the function, and the options of appointment in the periodic list. N work flags are formed to indicate whether the function is activated or not, the flag bit is 0 for not working, 1 for working, and finally a control command comprising at least one function appointment is sent to the controlled smart home appliance;

Step 5. After the controlled smart home appliance receives the appointment control instruction, only when the controlled smart home appliance ID matches, the MCU of the controlled smart home appliance obtains the countdown value of the function activation counter, the countdown value of the function duration counter, corresponding function ID, function control parameters, flag bit for cyclic control. N work flag bits and shift control bits used to indicate whether the function is activated or not from the appointment control instruction, the function activation counter and function duration counter of the microcontroller count down respectively, in conjunction with N work flags used to indicate whether the function is activated or not of the cyclic shift, so as to periodically control the cyclic activation and deactivation of the specific function of the controlled smart home appliance at the time point when the function is activated.

In another preferred embodiment, in the flag bit of whether or not to cyclically control, 0 represents no appointment or a single appointment task, and 1 represents that there is a cyclic appointment task.

In another preferred embodiment, the periodically controlling the cyclic activation and deactivation of specific functions of the controlled smart home appliances at the time point when the function is activated comprises the following steps:

Step (1) The function activation counter starts to count down until the countdown value is zero, and the corresponding function is started according to the function control parameters, and the function duration counter starts to count down until the countdown value of the function duration counter is zero, then the function is turned off;

Step (2) At the same time that the function duration counter starts to count down, it is judged that the flag bit for cyclic control is 1, then the countdown value of the function activation counter is set according to T1, the countdown is started, and go to step (3);

Step (3) When the countdown value of the function activation counter is zero, judge the countdown value of the function duration counter, if it is not zero, go to step (4), otherwise judge the value of the first bit of the N work flag bits used to indicate whether the function is activated or not, if the value of the first bit is 0, go to step (4), if it is 1, start the corresponding function according to the function control parameter, and the function duration counter starts to count down until it reaches zero, at the same time the function is activated, go to step (4);

Step (4) the N work flag bits used to indicate whether the function is activated or not moves one bit under the action of the shift control bit; set the countdown value of the function activation counter according to T1, start the countdown, and return to step (3) until it is zero, so loop control.

Advantages, among others, of the embodiments disclosed herein include:

(1) Only when the user control interface completes the appointment setting, the mobile terminal sends the appointment control instruction to the controlled smart home appliance. The mobile terminal does not send the appointment control instruction to the controlled smart home appliance until the next time the user updates the appointment setting, the mobile terminal sends the appointment control instruction to the controlled smart home appliance again to update the appointment control of controlled smart home appliances, so as to reduce the dependence of controlled smart home appliances on mobile terminals as much as possible, and reduce the number of communication interactions between the mobile terminal and the controlled smart home appliances;

(2) The controlled smart home appliance receives the appointment control instruction sent by the mobile terminal, uses the function activation counter and the function duration counter of the microcontroller to count down respectively, and cooperates with the cyclic shift of the N work flag bits used to indicate whether the function is activated or not to realize the cycle control of the function, the microcontroller does not need to be configured with a clock module, which not only reduces the cost, but also does not need to calibrate the clock regularly, which improves the accuracy of the appointment control.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

FIG. 1A depicts a portion of a flow chart in a method of controlling the appointment of functions of smart home appliances;

FIG. 1B depicts another portion of a flow chart in a method of controlling the appointment of functions of smart home appliances; and FIG. 1C depicts still another portion of a flow chart in a method of controlling the appointment of functions of smart home appliances.

DETAILED DESCRIPTION OF THE EMBODIMENTS

The method for controlling the appointment of functions of smart home appliances of the present invention comprises at least one mobile terminal providing a user control interface, and at least one smart home appliance capable of communicating with the mobile terminal, the control module of the smart home appliance is a microcontroller with a function activation counter and a function duration counter, the method comprises the following steps.

Step 1. Set the mobile terminal and the controlled smart home appliance in the same wireless communication network, such as Wif-Fi or Bluetooth, or via a common remote server, so that the mobile terminal and the controlled smart home appliance can realize communication interaction.

Step 2. Define the communication protocol between the mobile terminal and the controlled smart home appliance, the data structure of a single function appointment sent by the mobile terminal is: the controlled smart home appliance ID+the countdown value of the function activation counter+the countdown value of the function duration counter+corresponding function ID+function control parameter+flag bit for cyclic control+N work flag bits used to indicate whether the function is activated or not+shift control bit.

In the flag bit of whether or not to cyclically control. 0 represents no appointment or a single appointment task, and 1 represents that there is a cyclic appointment task.

The shift control bit is used to control the value of the first bit of N work flag bits used to indicate whether the function is activated or not to move to the last bit, and the values of other bits are all shifted to the left by one.

Step 3. The user control interface provided by the mobile terminal comprises the following input items and/or options:

a list of certified controlled smart home appliances, a list of functions corresponding to the controlled smart home appliances, a parameter input and/or selection list corresponding to each function, the time point of the activation of the function, the duration of the function, the periodic list of optional function, the periodic list provides N options of appointment, the interval between the two options is T1, for example, the periodic list includes seven options from Monday to Sunday. The N=7 and T1 is 24 hours. If the time point of the function appointment is set to 15:00, the periodic list selects Wednesday and Saturday, which means the selected function of the controlled smart home appliance will be activated every Wednesday and Saturday at 15:00; only when the appointment setting is completed on the user control interface, the mobile terminal sends the appointment control instruction to the controlled smart home appliance, the mobile terminal does not send the appointment control instruction until the next time the appointment setting is updated.

Step 4. After the user completes the appointment setting, the mobile terminal calculates the countdown value of the function activation counter according to the interval from the current time at the time of setting to the time point of the activation of the function, and calculates the countdown value of the function duration counter according to the duration of the function, and at the same time, according to the current time, the time point of the activation of the function, the duration of the function, and the options of appointment in the periodic list. N work flags are formed to indicate whether the function is activated or not, the flag bit is 0 for not working, 1 for working, and finally a control command comprising at least one function appointment is sent to the controlled smart home appliance.

Step 5. After the controlled smart home appliance receives the appointment control instruction, only when the controlled smart home appliance ID matches, the MCU of the controlled smart home appliance obtains the countdown value of the function activation counter, the countdown value of the function duration counter, corresponding function ID, function control parameters, flag bit for cyclic control. N work flag bits and shift control bits used to indicate whether the function is activated or not from the appointment control instruction, start the following steps.

Step (1) The function activation counter starts to count down until the countdown value is zero, and the corresponding function is started according to the function control parameters, and the function duration counter starts to count down until the countdown value of the function duration counter is zero, then the function is turned off.

Step (2) At the same time that the function duration counter starts to count down, it is judged that the flag bit for cyclic control is 1, then the countdown value of the function activation counter is set according to T1, the countdown is started, and go to step (3).

Step (3) When the countdown value of the function activation counter is zero, judge the countdown value of the function duration counter, if it is not zero, go to step (4), otherwise judge the value of the first bit of the N work flag bits used to indicate whether the function is activated or not, if the value of the first bit is 0, go to step (4), if it is 1, start the corresponding function according to the function control parameter, and the function duration counter starts to count down until it reaches zero, at the same time the function is activated, go to step (4).

Step (4) the N work flag bits used to indicate whether the function is activated or not moves one bit under the action of the shift control bit; set the countdown value of the function activation counter according to T1, start the countdown, and return to step (3) until it is zero, so loop control.

Exemplary embodiments of the present application provide, among others, the following advantages.

(1) Only when the user control interface completes the appointment setting, the mobile terminal sends the appointment control instruction to the controlled smart home appliance. The mobile terminal does not send the appointment control instruction to the controlled smart home appliance until the next time the user updates the appointment setting, the mobile terminal sends the appointment control instruction to the controlled smart home appliance again to update the appointment control of controlled smart home appliances, so as to reduce the dependence of controlled smart home appliances on mobile terminals as much as possible, and reduce the number of communication interactions between the mobile terminal and the controlled smart home appliances.

(2) The controlled smart home appliance receives the appointment control instruction sent by the mobile terminal, uses the function activation counter and the function duration counter of the microcontroller to count down respectively, and cooperates with the cyclic shift of the N work flag bits used to indicate whether the function is activated or not to realize the cycle control of the function, the microcontroller does not need to be configured with a clock module, which not only reduces the cost, but also does not need to calibrate the clock regularly, which improves the accuracy of the appointment control.

The method described above may also be represented in flow chart form.

FIGS. 1A-1C together depict a flow chart of the above-described method for controlling the appointment of functions of smart home appliances, wherein comprising at least one mobile terminal providing a user control interface, and at least one smart home appliance capable of communicating with the mobile terminal, a control module of the smart home appliance is a microcontroller with a function activation counter and a function duration counter. FIG. 1A depicts at block 10 setting the mobile terminal and the controlled smart home appliance in the same wireless communication network, or via a common remote server, so that the mobile terminal and the controlled smart home appliance can realize communication interaction. FIG. 1A also depicts at block 20 defining the communication protocol between the mobile terminal and the controlled smart home appliance, a data structure of a single function appointment sent by the mobile terminal is a controlled smart home appliance ID+a countdown value of the function activation counter+a countdown value of the function duration counter+a corresponding function ID+a function control parameter+a flag bit for cyclic control+a N work flag bits used to indicate whether the function is activated or not+a shift control bit. FIG. 1A further depicts at block 30 that the shift control bit controls the value of the first bit of the N work flag bits used to indicate whether the function is activated or not to move to the last bit, and the values of other bits are all shifted to the left by one.

FIG. 1B continues the method from FIG. 1A and depicts at block 40 completing an appointment setting on the user control interface provided by the mobile terminal, the user control interface comprising the following input items and/or options: a list of certified controlled smart home appliances, a list of functions corresponding to the controlled smart home appliances, a parameter input and/or selection list corresponding to each function, a time point of the activation of the function, a duration of the function, a periodic list of optional function, a periodic list provides N options of appointment, an interval between the two options is T1; only when the appointment setting is completed on the user control interface, the mobile terminal sending an appointment control instruction to the controlled smart home appliance, the mobile terminal does not send the appointment control instruction until the next time the appointment setting is updated. FIG. 1B also depicts at block 50 after the user completes the appointment setting, calculating with the mobile terminal the countdown value of the function activation counter according to the interval from the current time at the time of setting to the time point of the activation of the function, and calculates the countdown value of the function duration counter according to the duration of the function, and at the same time, according to the current time, the time point of the activation of the function, the duration of the function, and the options of appointment in the periodic list. N work flags are formed to indicate whether the function is activated or not, the flag bit is 0 for not working, 1 for working, and sending a control command comprising at least one function appointment to the controlled smart home appliance.

FIG. 1C continues the method from FIG. 1B and depicts at block 60 after the controlled smart home appliance receives the appointment control instruction, only when the controlled smart home appliance ID matches, an MCU of the controlled smart home appliance obtains the countdown value of the function activation counter, the countdown value of the function duration counter, corresponding function ID, function control parameters, flag bit for cyclic control. N work flag bits and shift control bits used to indicate whether the function is activated or not from the appointment control instruction, the function activation counter and function duration counter of the microcontroller count down respectively, in conjunction with N work flags used to indicate whether the function is activated or not of the cyclic shift, so as to periodically control the cyclic activation and deactivation of the specific function of the controlled smart home appliance at the time point when the function is activated.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A method for controlling the appointment of functions of smart home appliances, wherein comprising at least one mobile terminal providing a user control interface, and at least one smart home appliance capable of communicating with the mobile terminal, a control module of the smart home appliance is a microcontroller with a function activation counter and a function duration counter, the method comprises the following steps:

setting the mobile terminal and the controlled smart home appliance in the same wireless communication network, or via a common remote server, so that the mobile terminal and the controlled smart home appliance can realize communication interaction;

defining the communication protocol between the mobile terminal and the controlled smart home appliance, a data structure of a single function appointment sent by the mobile terminal is: a controlled smart home appliance ID+a countdown value of the function activation counter+a countdown value of the function duration counter+a corresponding function ID+a function control parameter+a flag bit for cyclic control+a N work flag bits used to indicate whether the function is activated or not+a shift control bit;

the shift control bit controls the value of the first bit of the N work flag bits used to indicate whether the function is activated or not to move to the last bit, and the values of other bits are all shifted to the left by one;

completing an appointment setting on the user control interface provided by the mobile terminal, the user control interface comprising the following input items and/or options: a list of certified controlled smart home appliances, a list of functions corresponding to the controlled smart home appliances, a parameter input and/or selection list corresponding to each function, a time point of the activation of the function, a duration of the function, a periodic list of optional function, a periodic list provides N options of appointment, an interval between the two options is T1; only when the appointment setting is completed on the user control interface, the mobile terminal sending an appointment control instruction to the controlled smart home appliance, the mobile terminal does not send the appointment control instruction until the next time the appointment setting is updated;

after the user completes the appointment setting, calculating with the mobile terminal the countdown value of the function activation counter according to the interval from the current time at the time of setting to the time point of the activation of the function, and calculates the countdown value of the function duration counter according to the duration of the function, and at the same time, according to the current time, the time point of the activation of the function, the duration of the function, and the options of appointment in the periodic list, N work flags are formed to indicate whether the function is activated or not, the flag bit is 0 for not working, 1 for working, and sending a control command comprising at least one function appointment to the controlled smart home appliance;

after the controlled smart home appliance receives the appointment control instruction, only when the controlled smart home appliance ID matches, an MCU of the controlled smart home appliance obtains the countdown value of the function activation counter, the countdown value of the function duration counter, corresponding function ID, function control parameters, flag bit for cyclic control, N work flag bits and shift control bits used to indicate whether the function is activated or not from the appointment control instruction, the function activation counter and function duration counter of the microcontroller count down respectively, in conjunction with N work flags used to indicate whether the function is activated or not of the cyclic shift, so as to periodically control the cyclic activation and deactivation of the specific function of the controlled smart home appliance at the time point when the function is activated.

2. The method according to claim 1, wherein in the flag bit of whether or not to cyclically control, 0 represents no appointment or a single appointment task, and 1 represents that there is a cyclic appointment task.

3. The method according to claim 2, wherein the periodically controlling the cyclic activation and deactivation of specific functions of the controlled smart home appliances at the time point when the function is activated comprises the following steps:

Step (1) The function activation counter starts to count down until the countdown value is zero, and the corresponding function is started according to the function control parameters, and the function duration counter starts to count down until the countdown value of the function duration counter is zero, then the function is turned off;

Step (2) At the same time that the function duration counter starts to count down, it is judged that the flag bit for cyclic control is 1, then the countdown value of the function activation counter is set according to T1, the countdown is started, and go to step (3);

Step (3) When the countdown value of the function activation counter is zero, judge the countdown value of the function duration counter, if it is not zero, go to step (4), otherwise judge the value of the first bit of the N work flag bits used to indicate whether the function is activated or not, if the value of the first bit is 0, go to step (4), if it is 1, start the corresponding function according to the function control parameter, and the function duration counter starts to count down until it reaches zero, at the same time the function is activated, go to step (4);

Step (4) the N work flag bits used to indicate whether the function is activated or not moves one bit under the action of the shift control bit; set the countdown value of the function activation counter according to T1, start the countdown, and return to step (3) until it is zero, so loop control.

\* \* \* \* \*